United States Patent [19]
Cabahug et al.

[11] Patent Number: 6,116,523
[45] Date of Patent: Sep. 12, 2000

[54] PRESSURE-COMPENSATING DRIP IRRIGATION HOSE AND METHOD FOR ITS MANUFACTURE

[75] Inventors: Jaime Cabahug, Lemon Grove; Que Tran; David Teegardin, both of San Diego; Michael DeFrank, Temecula, all of Calif.

[73] Assignee: T-Systems International, Inc., San Diego, Calif.

[21] Appl. No.: 09/308,060

[22] PCT Filed: May 6, 1998

[86] PCT No.: PCT/US98/09254

§ 371 Date: Dec. 6, 1999

§ 102(e) Date: Dec. 6, 1999

[87] PCT Pub. No.: WO98/50167

PCT Pub. Date: Nov. 12, 1998

Related U.S. Application Data

[60] Provisional application No. 60/045,764, May 6, 1997, and provisional application No. 60/055,992, Aug. 18, 1997.

[51] Int. Cl.$^7$ ...................................................... B05B 15/00
[52] U.S. Cl. ............................................. 239/542; 138/42
[58] Field of Search ..................................... 239/542, 547; 138/26, 42

[56] References Cited

U.S. PATENT DOCUMENTS

| | | |
|---|---|---|
| 4,984,739 | 1/1991 | Allport . |
| 5,123,984 | 6/1992 | Allport et al. . |
| 5,282,578 | 2/1994 | De Frank . |
| 5,364,032 | 11/1994 | De Frank . |
| 5,522,551 | 6/1996 | De Frank et al. . |
| 5,673,852 | 10/1997 | Roberts . |
| 5,732,887 | 3/1998 | Roberts . |

*Primary Examiner*—Lesley D. Morris
*Attorney, Agent, or Firm*—Christie, Parker & Hale, LLP

[57] ABSTRACT

A pressure-compensating drip irrigation hose (10) has a water supply passage (26) and a flow regulating channel (24) smaller than the water supply passage (26). The flow regulating channel (24) comprises at least one inlet section (28), at least one outlet section (32), and at least one nozzle section (34) between an inlet section (28) and an outlet section (32). The inlet section (28) comprises one or more openings (38) connecting the water supply passage (26) to the flow regulating channel (24). The outlet section comprises one or more openings connecting the flow regulating channel (24) to the exterior of the hose (10). Preferably the flow regulating channel (24) further comprises at least one turbulent flow section (30) between an inlet section (28) and an outlet section (32). The nozzle section (34) is preferably between an inlet section (28) and a turbulent flow section (30). A method for making the drip irrigation hose (10) is also provided.

35 Claims, 8 Drawing Sheets

PRESSURE-COMPENSATING DRIP IRRIGATION HOSE AND METHOD FOR ITS MANUFACTURE

This application claims benefit of Provisional application Ser. No. 60/045,764 filed May 6, 1997, which is a provision of Ser. No. 60/055,992 filed Aug. 18, 1997.

BACKGROUND OF THE INVENTION

The invention relates to drip irrigation, and more particularly to a drip irrigation hose with pressure compensation and a method for its manufacture.

Drip irrigation systems have come into widespread use in the agricultural area. Drip irrigation systems supply water at a slow, controlled rate to the root zone of the particular plants being irrigated. Typically, drip irrigation is accomplished by providing a low volume water outlet at each plant that permits a limited dripping of water directly to the root zone of the particular plant. Because evaporation, runoff, overwatering, and watering beyond the root zone are eliminated, substantial water and nutrient savings are realized. In addition, drip irrigation reduces contaminants to the water table by enabling the farmer to supply only enough water and fertilizer to reach the plants, reducing excess water that would run off and contaminate the water table below.

Drip irrigation hoses tend to be relatively long to be able to extend across a field. As the water travels along the hose away from the water source, the pressure of the water decreases. Thus, the water pressure at the beginning of the hose (near the water source) is greater than that at the far end of the hose. Because the drip rate of the hose is a function of the water pressure, the drip rate at the beginning of the hose tends to be greater than at the end of the hose. Thus, it is desirable to incorporate pressure-compensating designs into the hoses to reduce the effect of the pressure difference over the length of the hose on the drip rate along the length of the hose.

SUMMARY OF THE INVENTION

The present invention is directed to a pressure-compensating drip irrigation hose having a water supply passage and a flow regulating channel smaller than the water supply passage. The flow regulating channel comprises at least one inlet section, at least one outlet section, and at least one nozzle section between an inlet section and an outlet section. The inlet section comprises one or more openings connecting the water supply passage to the flow regulating channel. The outlet section comprises one or more openings connecting the flow regulating channel to the exterior of the hose. Preferably the flow regulating channel further comprises at least one turbulent flow section between an inlet section and an outlet section. The nozzle section is preferably between an inlet section and a turbulent flow section.

In a particularly preferred embodiment, the invention is directed to pressure-compensating drip irrigation hose having a water supply passage and a flow regulating channel smaller than the water supply passage. The flow regulating channel comprises one inlet section, one outlet section, two turbulent flow regions, and two nozzle sections. The inlet section comprises a plurality of pillars with a plurality of openings between the pillars. The outlet section comprises a slit outlet. The two turbulent flow sections are between the inlet section and the outlet section. Each turbulent flow section comprises a series of upstream-facing, nonoverlapping, interlaced chevrons, and the two turbulent flows are approximately equal in length. The two nozzle sections each comprise a fin. One nozzle section is between the inlet section and one of the turbulent flow sections and the second nozzle section is between the two turbulent flow sections.

Another embodiment of the invention is a drip irrigation hose having a water supply passage and a flow regulating channel smaller than the water supply passage. The flow regulating channel comprises an inlet section, an outlet section, and a turbulent flow region between the inlet section and outlet section. The turbulent flow region comprises a series of resistance features that are nonoverlapping. Preferably the resistance features are interlaced, upstream-facing chevrons.

The invention is also directed to a method for making a pressure-compensating drip irrigation hose at an assembly station. The method comprises continuously transporting through the assembly station a first strip of plastic film having inner and outer longitudinal margins and a longitudinal central region between the margins. Outlet holes are formed along the length of the film. The inner margin is folded, and one or more continuous molten beads of compatible plastic are deposited onto the outside surface of the inner margins. The one or more beads are formed into a flow regulating channel defined by side walls and having at least one nozzle section. The outer margin is folded onto the inner margin, with the flow regulating channel formed therebetween.

DESCRIPTION OF THE DRAWINGS

PIG. 3 is a top sectional view of a flow regulating passage according to the invention having two different-sized turbulent flow sections and two nozzle sections each comprising a fin.

DETAILED DESCRIPTION OF THE INVENTION

The present invention is directed to pressure-compensating drip irrigation hoses 10 and pressure-compensating emitters 12 for use in drip irrigation hoses. Pressure-compensation is achieved by the use of nozzle sections, described in more detail below.

Figure 1:
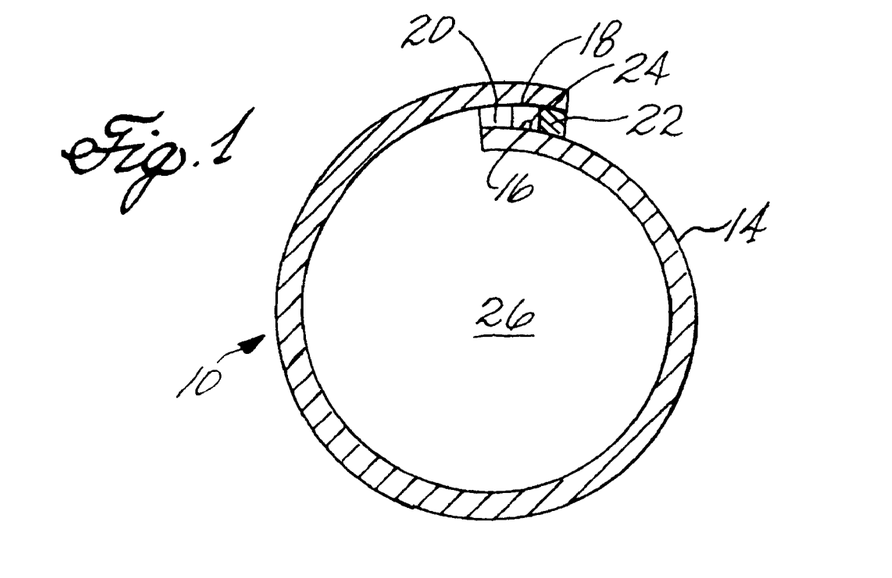
FIG. 1 is a cross-sectional view of a drip irrigation hose having a flow regulating channel between its margins.

As shown in FIG. 1, a drip irrigation hose 10 is made from an elongated strip of plastic film 14, which is typically 4 to 15 mil thick. The film 14 can be made of any suitable material, for example, a laminate of high density polyethylene or polypropylene. Film 14 is folded longitudinally to form overlapping inner and outer longitudinal margins 16 and 18, thus creating a seam. A first longitudinal rib 20 partially seals margins 16 and 18. A second longitudinal rib 22, outboard of rib 20, completely seals margins 16 and 18. Ribs 20 and 22 contain a repeating longitudinal pattern that defines a series of small flow regulating channels 24 along the length of the hose 10. By virtue of the longitudinal fold in film 14, the interior surface of film 14 defines a relatively large water supply passage 26. The water supply passage 26 is connected to a source of water under pressure, not shown. Examples of such constructions are described in U.S. Pat. Nos. 4,247,051, 4,984,739, 5,282,578, and 5,522,551, the disclosures of which are incorporated herein by reference.

Figure 2:
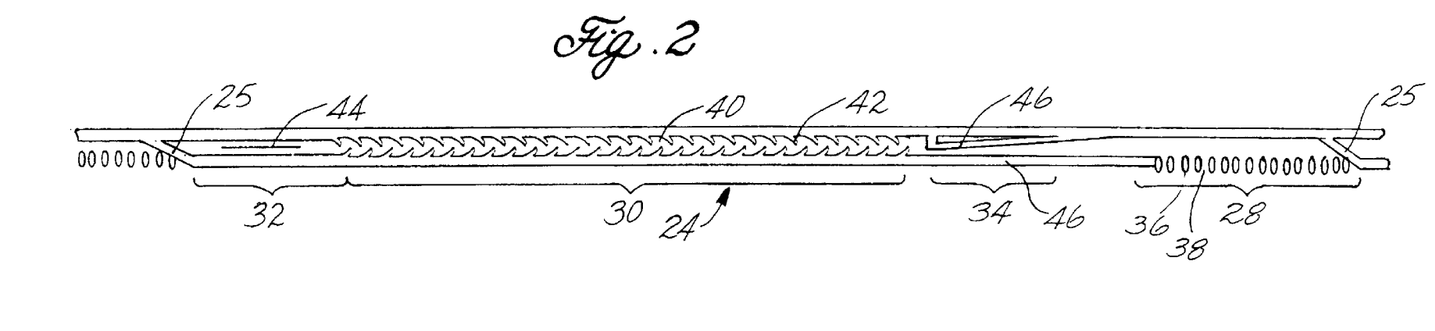
FIG. 2 is a top sectional view of a flow regulating passage according to the invention having a nozzle section comprising a relatively long converging sidewall.

As shown in FIG. 2, the flow regulating channels 24 each have an inlet section 28, a turbulent flow section 30, an outlet section 32, and a nozzle section 34 (referred to in the provisional application as a "venturi section"). The flow regulating channels 24 each have a much smaller cross-sectional area than the water supply passage 26. Accordingly, each flow regulating channel 24 creates a passage between the water supply passage 26 and the outside of the hose 10 that reduces the pressure and controls the flow rate of the water flowing through it.

For each flow regulating channel 24, the inlet section 28 comprises one or more inlet openings to allow water to flow from the water supply passage 26 into the flow regulating channel 24. In the depicted embodiment, the inlet section 28 comprises a plurality of pillars 36 between which are formed openings 38. As would be recognized by one skilled in the art, the inlet section 28 can have any other design that permits water to enter the flow regulating channel 24 from the water supply passage 26.

The turbulent flow section 30 comprises a turbulent flow path 40 that dissipates energy of the water by creating turbulence. In the depicted embodiment, the turbulent flow path 40 is a serpentine flow path formed by a plurality of interlaced and overlapping (i.e., having a positive overlap), upstream-facing chevrons 42. As used herein, the term "chevrons" refers to generally chisel-shaped features, as depicted in FIG. 2. The turbulent flow path 40 could have any other suitable design that achieves the above-stated purpose. For example, the turbulent flow path 40 could have any type of resistance features similar to the depicted chevrons that cause the water to divert and accelerate. The resistance features can be any suitable shape, for example, triangular, square, rectangular or rectangular having a rounded end. Preferably, the resistance features have a pointed tip, for example, chevrons or triangular-shaped features. It is also preferred for the resistance features to be upstream-facing so as to increase the resistance.

The nozzle section 34 comprises a region that creates a nozzle effect, i.e., reduces the cross-sectional area of the water flow path and diverts the flow, thus guiding the water into a narrow channel increasing its velocity. In the depicted embodiment, the nozzle section 34 comprises two sidewalls 46, with one sidewall converging toward one edge of the turbulent flow section 30. Thus, the water exiting the nozzle section 34 impacts against the first chevron 42. The converging sidewall 46 increases the velocity of the water exiting the nozzle section 34. The resulting impact against the first chevron 42 creates turbulence and a back-pressure. As the water pressure at the inlet section 28 increases, the outlet velocity increases, and thus the back pressure increases. This design tends to reduce the variation in the water flow rate over the length of the hose 10 despite the pressure changes over the length of the hose. Alternatively, both sidewalls 46 can converge, either toward the middle of the flow regulating channel 24 or to one side. For example, if diversion of the flow is not desired, the nozzle section can have sidewalls that converge to the middle of the flow regulating channel.

Water flows to the exterior of the hose from the flow regulating channel 24 through the outlet section 32. The outlet section 32 comprises one or more openings connecting the flow regulating channel 24 to the exterior of the hose 10. In the depicted embodiment, the outlet section 32 comprises a single knife-formed slit outlet 44. Alternatively, the outlet section can comprises one or more outlet holes. Any other outlet design permitting water flow to the exterior of the hose can also be used.

A plurality of flow regulating channels 24 extend along the length of the hose 10. Preferably the flow regulating channels 24 all have the same pattern with a divider 25 between the channels. FIG. 2 shows a relatively small divider 25 between two flow regulating channels 24.

Figure 3:
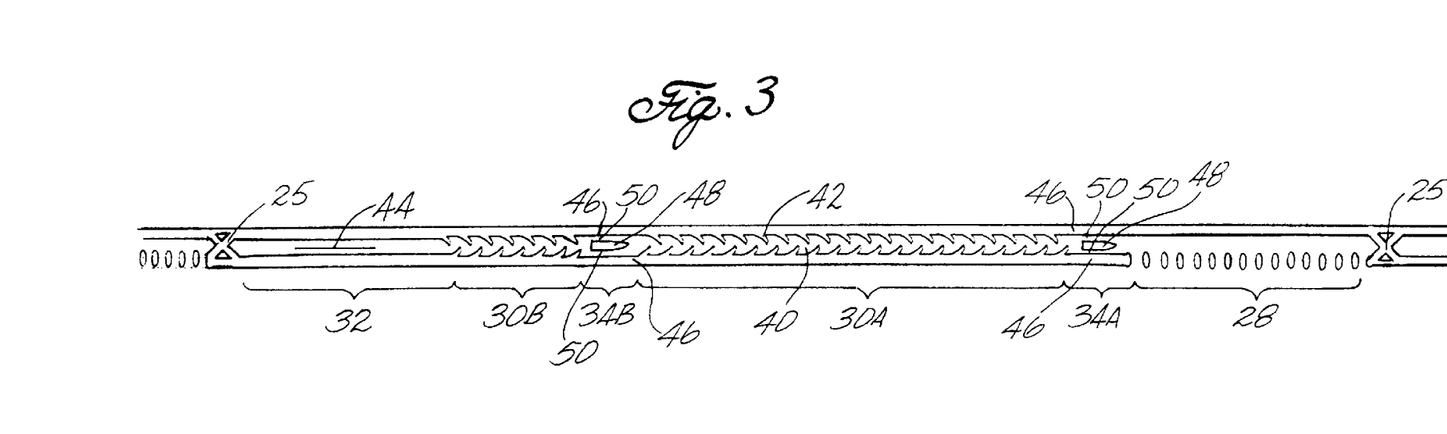

An alternative flow regulating channel design is shown in FIG. 3. The same reference numerals identify the common elements in the different drawings. The flow regulating channel 24 comprises two nozzle sections 34A and 34B and two turbulent flow sections 30A and 30B. The first nozzle section 34A connects the inlet section 28 to the first turbulent flow section 30A, and the second nozzle section 34B connects the first turbulent flow section 30A to the second turbulent flow section 30B. Each nozzle section 34A and 34B comprises an upstream-tapered fin 48. The fin 48 forms two nozzles 50, each between the fin 48 and one of the two nozzle sidewalls 46. The fin forms a central island around which water is accelerated. Each nozzle 50 directs water to impact against a chevron 42 in the downstream turbulent flow section 30, thereby creating a backpressure similar to that described above. In the depicted embodiment, the second turbulent flow region 30B is approximately one third of the size of the first turbulent flow region 30A.

Figure 4:
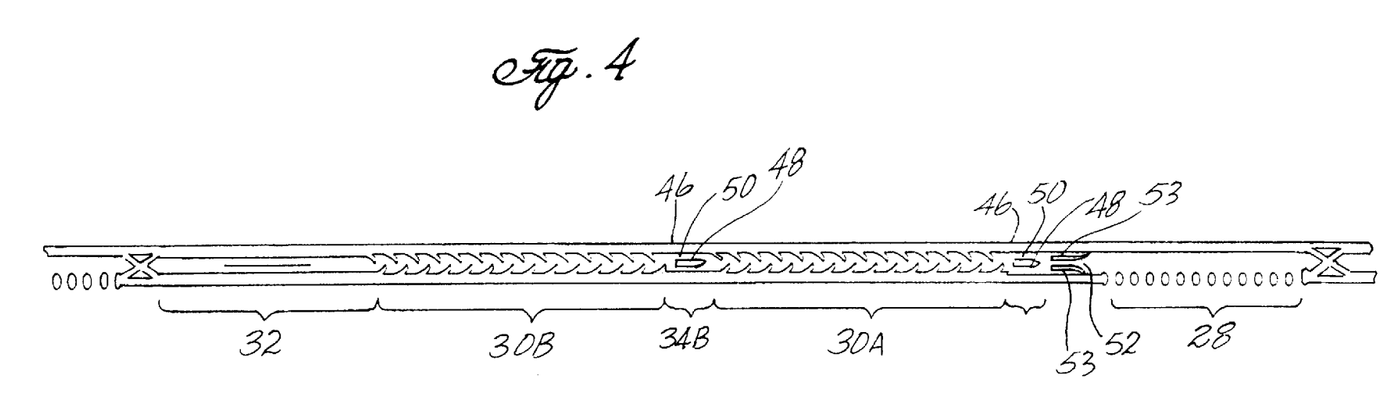
FIG. 4 is a top sectional view of a flow regulating passage according to the invention having two approximately equal-sized turbulent flow sections and two nozzle sections each comprising a fin and one nozzle section also comprising an additional nozzle.

In another embodiment, as shown in FIG. 4, the first nozzle section 34A further comprises an additional nozzle 52 between the inlet section 28 and the fin 48. The nozzle 52 is formed by two converging walls 53. Preferably the nozzle 52 is positioned so that water flowing from its outlet impacts on the fin 48, creating a pressure-compensating back pressure.

Figure 5:
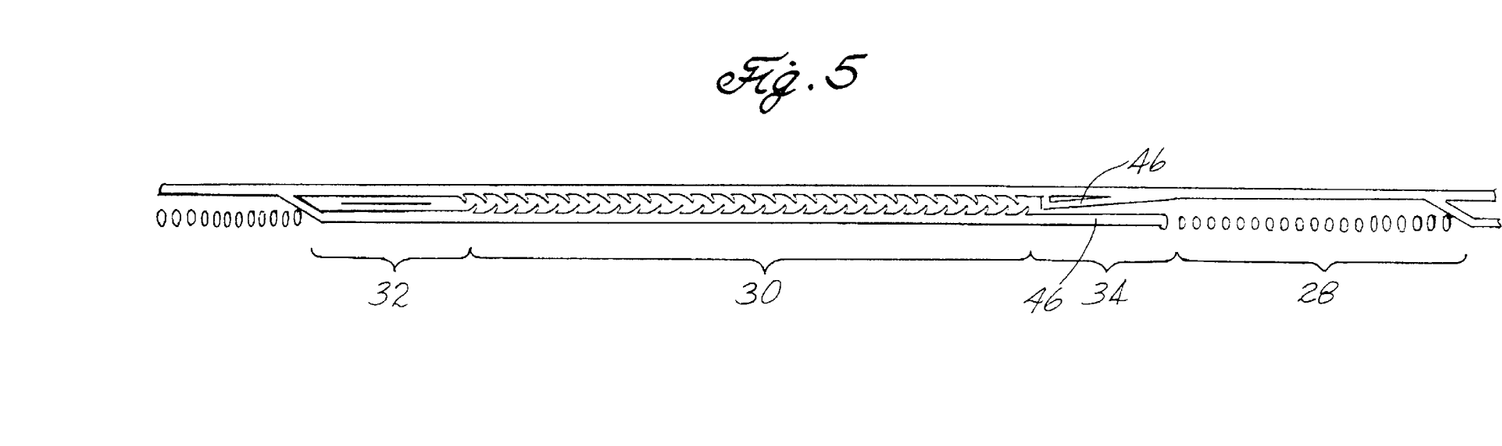
FIG. 5 is a top sectional view of a flow regulating passage according to the invention having a nozzle section comprising a relatively short converging sidewall.

Numerous other flow regulating designs incorporating the concepts of the present invention are possible. For example, as shown in FIG. 5, the length of nozzle section 34 can be reduced by shortening the converging sidewall 46.

Figure 6:
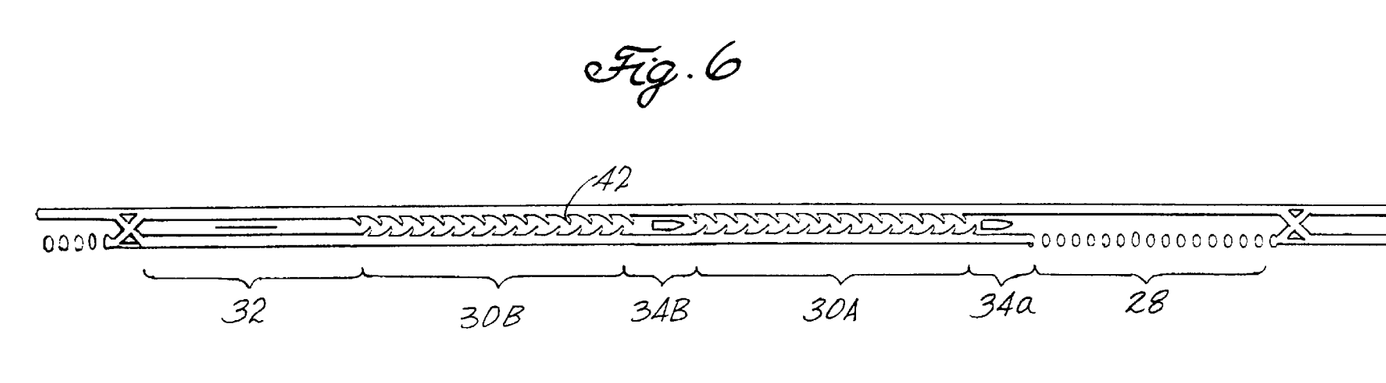
FIG. 6 is a top sectional view of a flow regulating passage according to the invention having two approximately equal-sized turbulent flow sections and two nozzle sections each comprising a fin.

The design of the turbulent flow section 30 can be modified in several respects. For example, both turbulent flow sections 30A and 30B can be approximately the same length, as shown in FIG. 6. Alternatively, a third turbulent flow section 30C can be added along with a third nozzle section 34C, whereby the lengths of the second and third turbulent flow sections are each approximately half the length of the first turbulent flow section, as depicted in FIG. 7.

Figure 7:
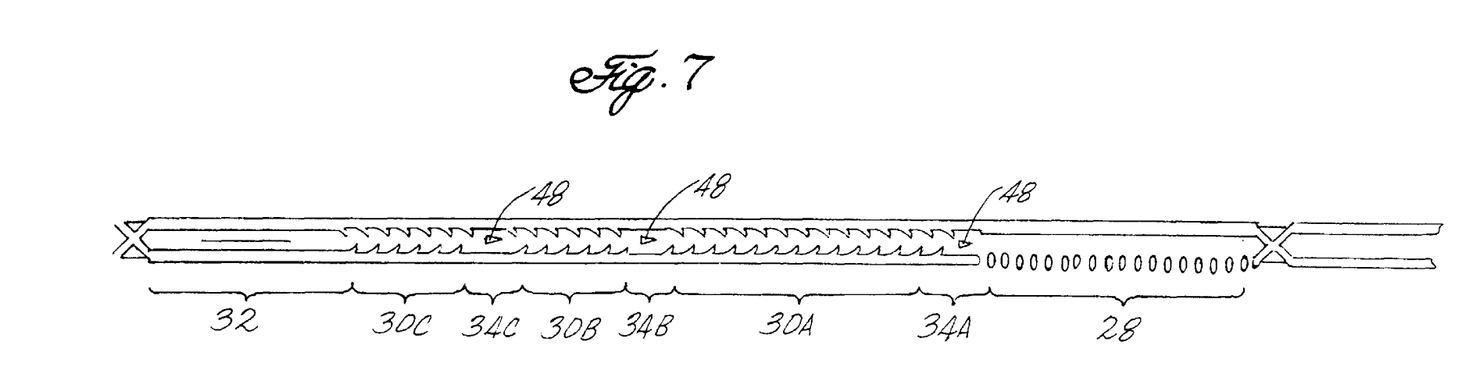
FIG. 7 is a top sectional view of a flow regulating passage according to the invention having three different-sized turbulent flow sections, each comprising non-overlapping chevrons, and three nozzle sections each comprising a fin.

Additionally, the chevrons 42 (or other resistance features) can be non-overlapping, i.e., have a negative overlap, as also depicted in FIG. 7. When the chevrons (or other resistance features) have a positive overlap, the extent of average overlap between the ends of the chevrons can range, for example, from about 0.006 inch to about 0.025 inch, preferably from about 0.005 inch to about 0.020 inch. Alternatively, when the chevrons (or other resistance features) have a negative overlap, the average distance between the ends of the chevrons can range, for example, from about 0.004 inch to about 0.025 inch, preferably from about 0.005 inch to about 0.020 inch. In a third alternative, the chevrons (or resistance features) have zero average overlap.

In another alternative embodiment, the flow regulating channel 24 comprises two inlet sections 28 that feed to a single outlet section 32. Each inlet section 28 is separated from the outlet section 32 by a turbulent flow section 30. A general description of such a design is described in U.S. application Ser. No. 08/683,604, filed Jul. 15, 1996, the disclosure of which is incorporated herein by reference. A nozzle section 34, such as any of those described above, can then be inserted after one or both inlet sections 28, before the corresponding turbulent flow section 30.

Additionally, other types of flow passages can be included in the flow regulating channels 24 of the present invention. For example, an additional pressure compensating region could be included whereby the region comprises one or more walls made of an elastomeric material capable of deforming into the flow region, thereby reducing the cross-sectional area of the region. Examples of such designs are described in U.S. patent application Ser. No. 60/055,992, filed Aug. 18, 1997, the disclosure of which is incorporated herein by reference.

The flow regulating channel designs of the present invention result in a reduced x-factor. X-factor is a measure of pressure compensation. Specifically, the drip flow rate of a hose is proportional to the water pressure at the inlets of the flow regulating channels raised to the exponent x. In the absence of pressure compensation, the x-factor is one, i.e., the flow rate is a linear function of the pressure. In the ideal case of perfect pressure compensation, the x-factor is zero, i.e., the flow rate is independent of pressure. Thus, a lower x-factor indicates increased pressure compensation. The x-factor values achieved in hoses using the inventive flow regulating channel designs preferably are less than about 0.48, more preferably are from about 0.38 to about 0.46, and still more preferably are from about 0.40 to about 0.44.

Figure 8:
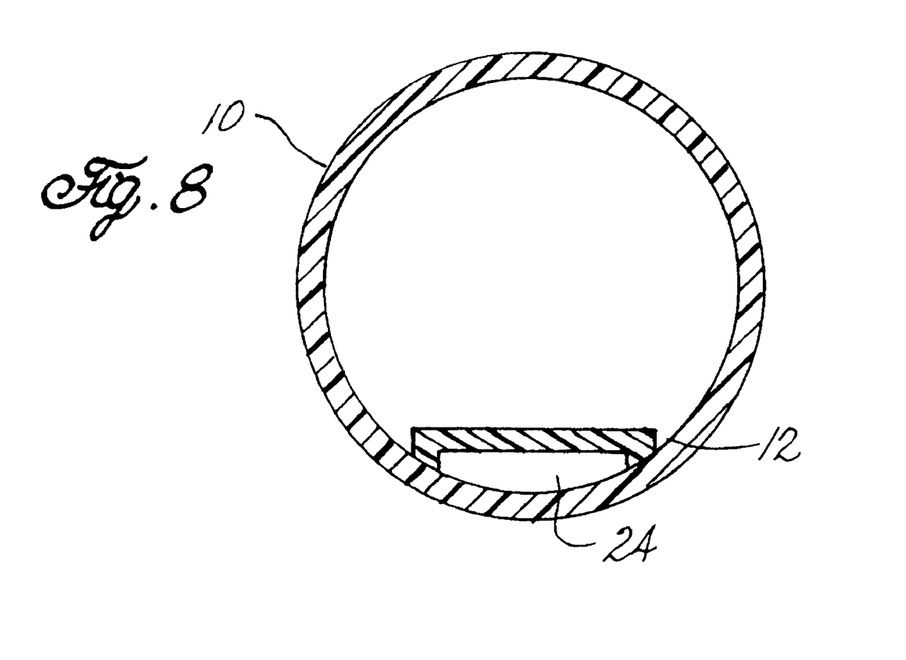
FIG. 8 is a cross-sectional view of a drip irrigation hose containing an emitter.

The flow regulating channels described above do not have to be formed in the margin of the hose, but can be located anywhere inside or outside of the hose as desired. For example, the above-described flow regulating channels can be used in continuous and discrete emitters, which are then placed inside or outside the hose. As shown in FIG. 8, an emitter 12 is attached to the inside of the hose 10. The emitter 12 comprises three walls and has a generally rectangular cross-sectional area with a fourth wall being formed by the hose 10. The flow regulating channel 24 is contained within the three walls of the emitter 12 and the wall of the hose 10. Alternatively, the emitter 12 can have four walls. Any emitter design providing a flow regulating channel 24 can be used in connection with the present invention. In the case of discrete emitters, it may be desirable to position the emitters on the outside of the hose rather than on the inside. The emitters 12 can be made of any material known to those skilled in the art, for example, a thermoplastic elastomer. Similarly, the hose 10 can be made of any suitable material, such as the film materials described above. Alternatively, the hose 10 can be extruded through a circular die as a seamless hose.

Figure 9:
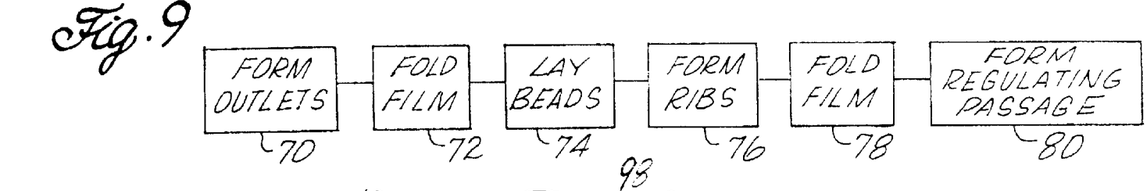
FIG. 9 is a block diagram representing a method of producing a drip irrigation hose according to the present invention.
Figure 10:
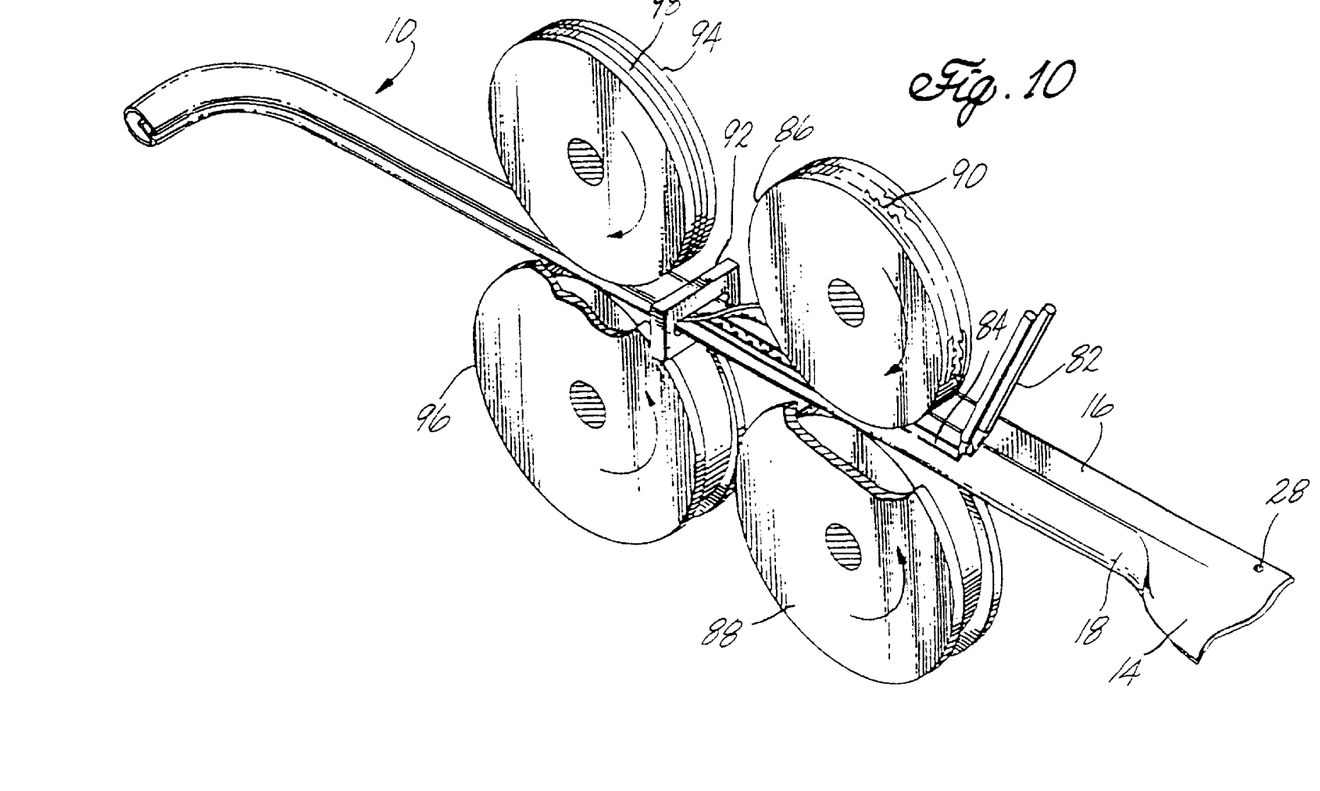
FIG. 10 is an elevated three-quarter view of an assembly station for making a drip irrigation hose according to the present invention.

FIGS. 9 and 10 depict a method for making the drip irrigation hose shown in FIG. 1. As represented by a block 70, the outlets 44 are first formed in film 14. Preferably each outlet 44 comprises a single longitudinal slit in the film 14. A preferred method and apparatus for forming such a knife-formed slit outlet is described in U.S. Pat. No. 5,522,551, the disclosure of which is incorporated herein by reference.

As represented by block 72, the inner margin 16 is then folded. As represented by block 74, one or more beads are laid on the outside surface of the inner margin 14 by one or more extrusion nozzles. As represented by block 76, a pattern is formed in ribs 20 and 22 by a molding wheel. As represented by block 78, outer margin 18 is then folded onto inner margin 16, with the formed ribs therebetween. Finally, as represented by block 80, flow regulating passage 24 is finished by passing inner margin 16, outer margin 18, and the ribs 20 and 22 through the nip of a form wheel and a backing wheel to set precisely the height of the ribs.

FIG. 10 illustrates an assembly station for performing the above-described steps. One or more extrusion nozzles 82 deposit one or more continuous longitudinal beads 84 on the outside surface of the inner margin 16. The film 14 is passed through the nip of a rotating molding wheel 86 and a rotating backing wheel 88. The molding wheel 86 contains a pattern of depressions 90 corresponding to the desired raised rib pattern, i.e., a pattern such as those shown in FIGS. 2 to 7. In the nip, beads 84 are shaped by molding wheel 86 to form the desired bead pattern repeatedly and continuously on film 14 for the entire length of the hose 10. After leaving the nip of wheels 86 and 88, the external margin 18 of the film 14 is folded by a guide 92 to overlap the inner margin 16. Finally, the overlapped margins of the film 14 pass through the nip of a form wheel 94 and a second backing wheel 96. The form wheel 94 has a groove 98 that depresses the ribs formed by the beads 84 to set the rib height at a specified value that determines the flow rate of the hose 10. During the described process, the film 14 is continuously transported by a conventional means, not shown. For example, the disclosed wheels could be driven, or other drive wheels could be provided, to transport the film.

The above-described embodiments of the invention are only considered to be preferred and illustrative of the inventive concepts. The scope of the invention is not to be restricted to such embodiments. Various and numerous other arrangements may be devised by one skilled in the art without departing from the spirit and scope of the invention.

What is claimed is:

1. A pressure-compensating drip irrigation hose having a water supply passage and a flow regulating channel smaller than the water supply passage, the flow regulating channel comprising at least one inlet section comprising one or more openings connecting the water supply passage to the flow regulating channel, at least one outlet section comprising one or more openings connecting the flow regulating channel to the exterior of the hose and at least one nozzle section between an inlet section and an outlet section the nozzle section comprising a region that reduces the cross-sectional area of the flow regulating channel and diverts the water flow to guide the water into a narrow channel and increase the water's velocity.

2. A hose according to claim 1, wherein tie flow regulating channel further comprises at least one turbulent flow section between an inlet section and an outlet section.

3. A hose according to claim 2, wherein the nozzle section is between an inlet section and a turbulent flow section.

4. A hose according to claim 1, comprising one inlet section, one outlet section, two turbulent flow sections and two nozzle sections, wherein the two turbulent flows sections are between the inlet section and the outlet section, and wherein one nozzle section is between the inlet section and one of the turbulent flow sections and the second nozzle section is between the two turbulent flow sections.

5. A hose according to claim 2, wherein the turbulent flow section comprises a series of chevrons.

6. A hose according to claim 5, wherein the turbulent flow section comprises a series of overlapping chevrons.

7. A hose according to clam 5, wherein the turbulent now section comprises a series of nonoverlapping chevrons.

8. A hose according to claim 4, wherein the turbulent flow sections comprises a series of chevrons.

9. A hose according to claim 8, wherein the turbulent flow sections comprises a series of overlapping chevrons.

10. A hose according to claim 8, wherein the turbulent flow sections comprises a series of nonoverlapping chevrons.

11. A hose according to claim 1, wherein the nozzle section comprises at least one converging wall.

12. A hose according to claim 1, wherein the nozzle section comprises a fin.

13. A hose according to claim 4, wherein at least one nozzle section comprises at least one converging wall.

14. A hose according to claim 4, wherein at least one nozzle section comprises a fin.

15. A hose according to claim 4, wherein each nozzle section comprises a fin.

16. A hose according to claim 4, wherein both turbulent flow sections have approximately the same length.

17. A hose according to claim 4, wherein one turbulent flow section is approximately half the size of the other turbulent flow section.

18. A hose according to claim 4, wherein one turbulent flow section is approximately one third of the size of the other turbulent flow section.

19. A hose according to clam 1, wherein the inlet section comprises a plurality of pillars with a plurality of openings between the pillars.

20. A hose according to claim 4, wherein the inlet section comprises a plurality of pillars with a plurality of openings between the pillars.

21. A hose according to claim 1, wherein the outlet section comprises a slit outlet.

22. A hose according to claim 4, wherein the outlet section comprises a slit outlet.

23. A pressure-compensating drip irrigation hose having a water supply passage and a flow regulating channel smaller than the water supply passage, the flow regulating channel comprising:

one inlet section comprising a plurality of pillars with a plurality of openings between the pillars;

one outlet section comprising A slit outlet;

two turbulent flow sections between the inlet section and the outlet section, each turbulent flow section comprising a series of upstream-facing, nonoverlapping interlaced chevrons, wherein the two turbulent flows are approximately equal in length; and two nozzle sections, wherein one nozzle section is between the inlet section and one of the turbulent flow sections and the second nozzle section is between the two turbulent flow sections, each nozzle section comprising a fin.

24. A drip irrigation hose having a water supply passage and a flow regulating channel smaller than the water supply passage, the flow regulating channel comprising an inlet section, an outlet section, and a turbulent flow region between the inlet section and outlet section, wherein the turbulent flow region comprises a series of resistance features that are nonoverlapping and further wherein the average distance between the ends of the resistance features is at least 0.004 inch.

25. A hose according to claim 24, wherein the average distance between the ends of the resistance features is from about 0.004 inch to about 0.025 inch.

26. A hose according to claim 24, wherein the average distance between the ends of the resistance features is from about 0.005 inch to about 0.020 inch.

27. A hose according to claim 24, wherein the resistance features are interlaced.

28. A hose according to claim 24, wherein the turbulent flow region comprises a series of chevrons that are nonoverlapping.

29. A hose according to claim 28, wherein the average distance between the ends of the chevrons is from about 0.004 inch to about 0.025 inch.

30. A hose according to claim 28, wherein the average distance between the ends of the chevrons is from about 0.004 inch to about 0.020 inch.

31. A hose according to claim 28, wherein the chevrons are interlaced.

32. A hose according to claim 24, wherein the resistance features are upstream-facing.

33. A hose according to claim 28, wherein the chevrons are upstream-facing.

34. A hose according to claim 24, wherein the resistance features are pointed.

35. A method for making a pressure-compensating drip irrigation hose at au assembly station comprising:

continuously transporting through the assembly station a first strip of plastic film having inner and outer longitudinal margins and a longitudinal central region between the margins;

forming outlet holes along the length of the film;

folding the inner margin;

depositing one or more continuous molten beads of compatible plastic onto the outside surface of the inner margins;

forming the one or more beads into a flow regulating channel defined by side walls and having at least one nozzle section; and folding the outer margin onto the inner margin, with the flow regulating channel formed therebetween.

* * * * *

UNITED STATES PATENT AND TRADEMARK OFFICE
CERTIFICATE OF CORRECTION

PATENT NO.    : 6,116,523
DATED         : September 12, 2000
INVENTOR(S)   : Jaime Cabahug; Que Tran; David Teegardin; Michael DeFrank It is certified that error appears in the above-identified patent and that said Letters Patent is hereby corrected as shown below:

Column 6,
Line 61, replace "wherein tie flow" with -- wherein the flow --

Column 7,
Lines 10 and 11, replace "turbulent now section" with -- turbulent flow section --

Column 8,
Line 42, replace "au assembly" with -- an assembly --

Signed and Sealed this

Nineteenth Day of March, 2002

Attest:

JAMES E. ROGAN
Attesting Officer    Director of the United States Patent and Trademark Office